US005636863A

United States Patent [19]
Reid et al.

[11] Patent Number: 5,636,863
[45] Date of Patent: Jun. 10, 1997

[54] VEHICLE STEERING COLUMN CONTROL SYSTEM

[75] Inventors: Scott A. Reid, Brookfield; Paul G. Rops, Germantown; James E. Hansen, Oak Creek; Ruth E. Hubbell, Milwaukee; Erich Rehm, West Bend, all of Wis.

[73] Assignee: Eaton Corporation, Cleveland, Ohio

[21] Appl. No.: 233,658

[22] Filed: Apr. 26, 1994

[51] Int. Cl.$^6$ ................................................ B60R 21/32
[52] U.S. Cl. ........................ 280/735; 280/731; 340/436
[58] Field of Search .............................. 280/734, 735, 280/731; 307/10.1; 439/15, 164; 340/428, 429, 436

[56] References Cited

U.S. PATENT DOCUMENTS

| | | | |
|---|---|---|---|
| 4,218,073 | 8/1980 | Cymbal | 439/15 |
| 4,422,699 | 12/1983 | Sakurai et al. | 439/164 |
| 4,608,550 | 8/1986 | Umebayashi et al. | 307/10.1 |
| 4,623,889 | 11/1986 | Tanaka et al. | 307/10.1 |
| 4,792,783 | 12/1988 | Burgess et al. | 307/10.1 |

FOREIGN PATENT DOCUMENTS

| | | | |
|---|---|---|---|
| 482234 A1 | 4/1992 | European Pat. Off. | 307/10.1 |
| 543483 A1 | 5/1993 | European Pat. Off. | 307/10.1 |
| 3520972 | 6/1986 | Germany | 307/10.1 |

Primary Examiner—Eric D. Culbreth

[57] ABSTRACT

A control circuit is provided for transferring power and communication signals through a wireless coupling device in a vehicle steering column. The device can comprise a rotary transformer having a primary and secondary magnetic structure respectfully associated with the wheel side and column side of the steering column. A squib power circuit transforms a high energy power signal suitable for firing an air bag from the column side to the wheel side. A low energy power circuit generates a signal from the column side to the wheel side suitable for operating isolated wheel side electronics, such as cruise control and the like. A tone encoder and decoder circuit communicates low level control signals suitable for signalling wheel side commands from the wheel side to the column side. The low energy power circuit and the tone encoder circuit operate simultaneously and continuously without signal debilitating interaction.

23 Claims, 6 Drawing Sheets

VEHICLE STEERING COLUMN CONTROL SYSTEM

BACKGROUND OF THE INVENTION

This invention pertains to the art of vehicle control systems and more particularly to a control system capable of generating an air bag deployment signal upon a vehicle collision for an air bag stored in a steering wheel/column and for also transferring a biasing power signal to control circuitry in the wheel for communicating selected driver control signals from the wheel through the column to sensor processing control circuitry. The invention is especially applicable to a control system for transferring signals across a rotating interface. The system is intended to be capable of transferring both an air bag deployment signal and driving control (cruise, climate control, etc.) signals from the steering wheel to the steering column. However, it will be appreciated to those skilled in the art that the invention could be readily adapted for use in other environments as, for example, where a plurality of signals of varying frequency and amplitude need to be communicated through a physically moving part, and in particular a part that is continually rotating.

When vehicle air bags were initially introduced on the market, it was necessary to remove driver control functions from the steering wheel and install them on stalks that emanated from the steering column. Typically, the only two items which remained that were wheel-mounted were the air bag and the horn. The signal for the horn was transferred from the wheel to the column through slip rings. The slip rings consisted of a ball contact located on the steering wheel and a circular conductor which was part of a "clock spring". The clock spring was a molded plastic part which housed a two conductor ribbon cable that connected the air bag to its control module. Such a clock spring is capable of maintaining electrical connections during rotation of the wheel.

As the demand for placement of driver controls back onto the steering wheel has become greater, the clock spring was changed to comprise a housing for a multi-conductor ribbon cable and/or slip ring. This arrangement allowed both the air bag and driver control switches to operate independently on the steering wheel. Some clock springs have as many as six conductor ribbon cables and no slip rings.

The numerous design concepts comprising adaptations of slip rings and clock rings have been fraught with problems and are of limited economic and practical value. Slip ring arrangements have always suffered from reliability and performance problems due to the inherent nature of the slip ring structure itself. The electrical integrity of the contacting methods will necessarily depreciate over time from dirt and/or wear and varying ambient conditions. In addition, the assembly requirements for multi-conductor ribbon cables in a steering column have been notoriously undesirable for the vehicle manufacturers, not only for the relatively high expense of the cable and contact components themselves, but also from the labor costs involved in the assembly operation.

The present invention contemplates a new and improved method and apparatus which overcomes the above-referred to problems to provide a new vehicle steering column control system which is relatively simple in design, economical to manufacture and assemble and provides high reliability and performance in deploying both an air bag ignition signal and communication of biasing power and driver control signals both to and from the steering wheel and the steering column.

BRIEF SUMMARY OF THE INVENTION

In accordance with the present invention, there is provided electronic control circuitry which accomplishes three major functions:

1. Provide a high power signal to a steering wheel rotary transformer sufficient to fire an air bag squib.

2. Provide driver communications (such as cruise control command signals) from the steering wheel back through the rotary transformer to the steering column, for various control purposes.

3. Supply continuous low-level operating power for isolated wheel side electronics that comprise the driver controlled communication devices, from the column side, through the transformer, to the wheel.

The system employs a rotary transformer that provides uniform coupling across a rotating interface regardless of the rotational angle between the primary and secondary magnetic structures. The transformer is of a sufficiently small size that it can be practically integrated into a steering wheel/column structure, yet is able to transfer the several amperes of current required to fire an air bag squib element.

The subject invention more particularly comprises a control circuit for transferring power and communications to a vehicle steering column comprising a rotary transformer having a primary and secondary magnetic structure, wherein the primary magnetic structure is associated with a column side of the steering column and the secondary side of the steering column is associated with the wheel side of the steering column. A first circuit portion transfers a high energy power signal suitable for firing an air bag from the column side to the wheel side. A second circuit portion transfers a low energy power signal from the column side to the wheel side suitable for operating isolated wheel side electronics. A third circuit portion communicates low-level control signals suitable for signalling wheel side commands from the wheel side to the column side, wherein the second and third circuits can simultaneously operate continuously without signal debilitating interaction. The high energy power signal transferred by the first circuit is of such energy that it will, of course, overwhelm the other signals, but in the condition of a collision, wherein the air bag is enabled, wheel side control signals will be irrelevant.

In accordance with another aspect of the present invention, the first circuit portion includes a fire switch associated with the column side which is enabled during the vehicle collision and a squib switch associated with the wheel side for connecting the high power signal to a squib element in a firing condition for the air bag. The squib switch includes a means for isolating the squib element from the low energy power signal and the low level control signals in normal operating conditions to preclude shunting of other functions thereof by the squib element.

In accordance with a further aspect of the present invention, the high energy power portion signal is tuned to a frequency detectably spaced from a frequency of the low energy power signal and the high energy power signal has a voltage level detectably spaced from a voltage level of the low level control signals. A filter segregates the low energy power signal and the low level control signals from the squib element. The filter comprises a frequency band filter for attenuating the low energy power signal and a level detection circuit for excluding the low level control signals.

In accordance with a more limited aspect of the present invention, the first circuit portion includes a squib power circuit associated with the power switch for generating the high power signal. The squib power circuit includes a test circuit for testing if the squib element is present and capable of receiving the high power signal at vehicle start up. Power up is detected from the control circuit and a pulse is supplied to the squib element of the high power signal at a selectively reduced power level selected to be below the ignition point of the squib, for exercising and demonstrating the full function of the circuit.

One benefit obtained by the present invention is an air bag control system which allows a transfer of control and power signals across a rotating interface with structural simplicity and high reliability. Previous structural requirements of multi-ribbon cable and slip ring conductors are avoided.

Another benefit obtained from the present invention is an air bag firing control system which is economically more efficient in assembly and structural cost.

A further benefit of the present invention is a steering column control circuit which employs signal control circuitry (DTMF) with proven performance achievements for enhanced reliability and performance, in combination with a signal transferring rotary transformer which provided a non-contacting signal transferring method.

Other benefits and advantages for the subject new control system will become apparent to those skilled in the art upon a reading and understanding of this specification.

BRIEF DESCRIPTION OF THE DRAWINGS

The invention may take physical form in certain elements and arrangements of elements the preferred and alternative embodiments of which will be described in detail in this specification and illustrated in the accompanying drawings which form a part hereof and wherein.

DETAILED DESCRIPTION OF THE INVENTION

Figure 1:
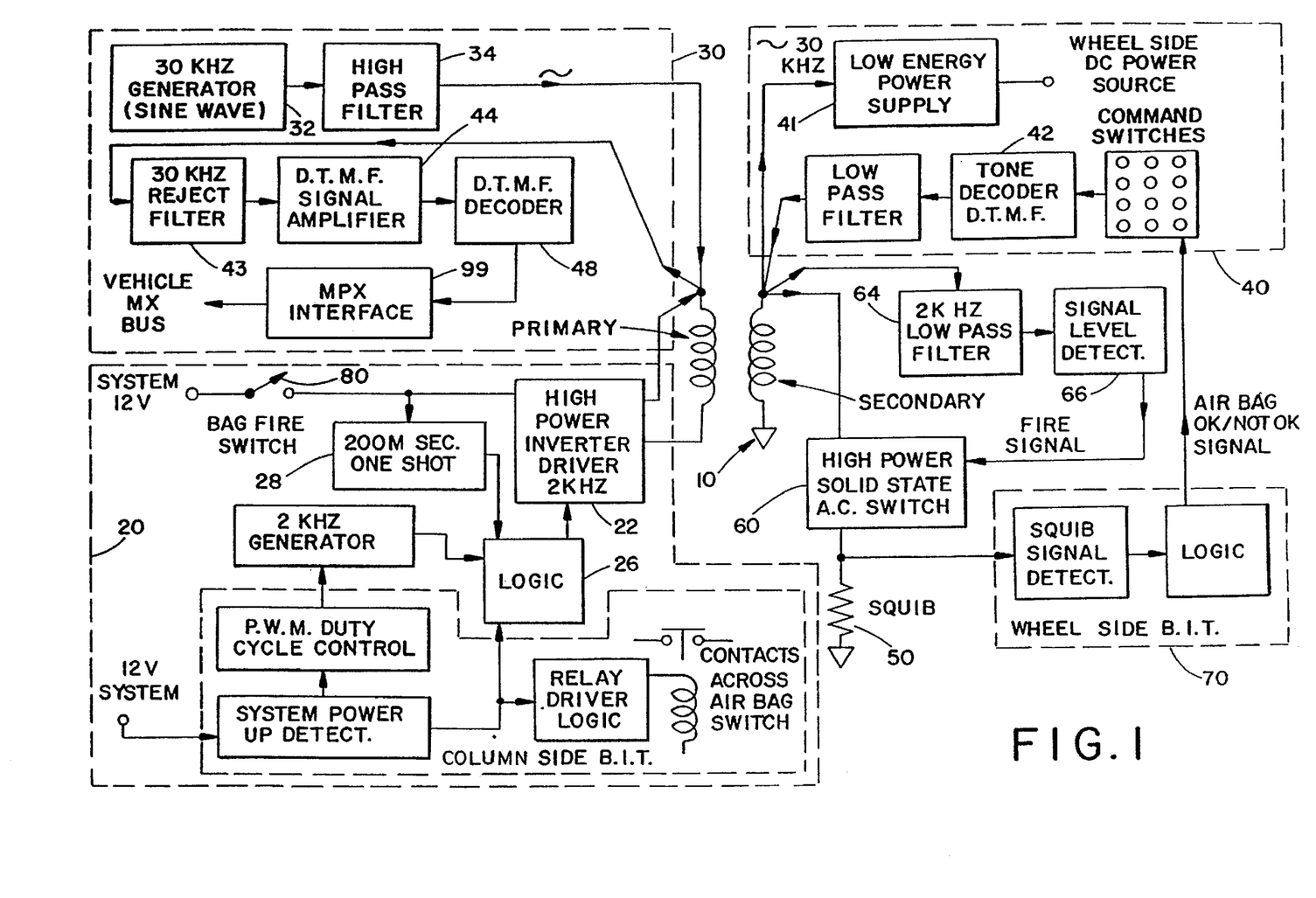
FIG. 1 is a block diagram of a steering wheel control system formed in accordance with the present invention.
Figure 2A:
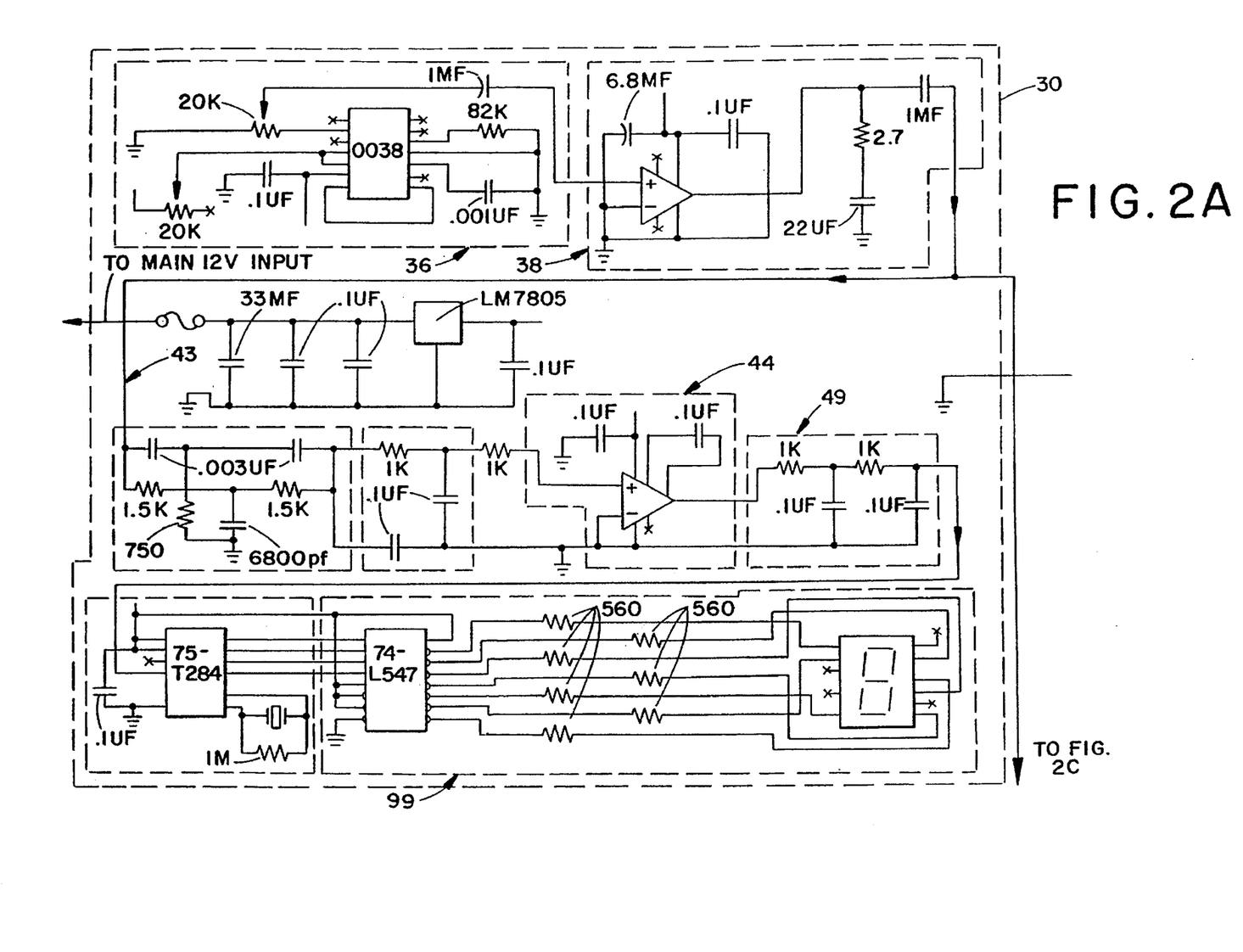
FIGS. 2A–2D comprise a detailed schematic of a circuit of the present invention and FIG. 3 comprises a schematic representation of a rotary transformer that can be utilized as part of the present invention.
Figure 2B:
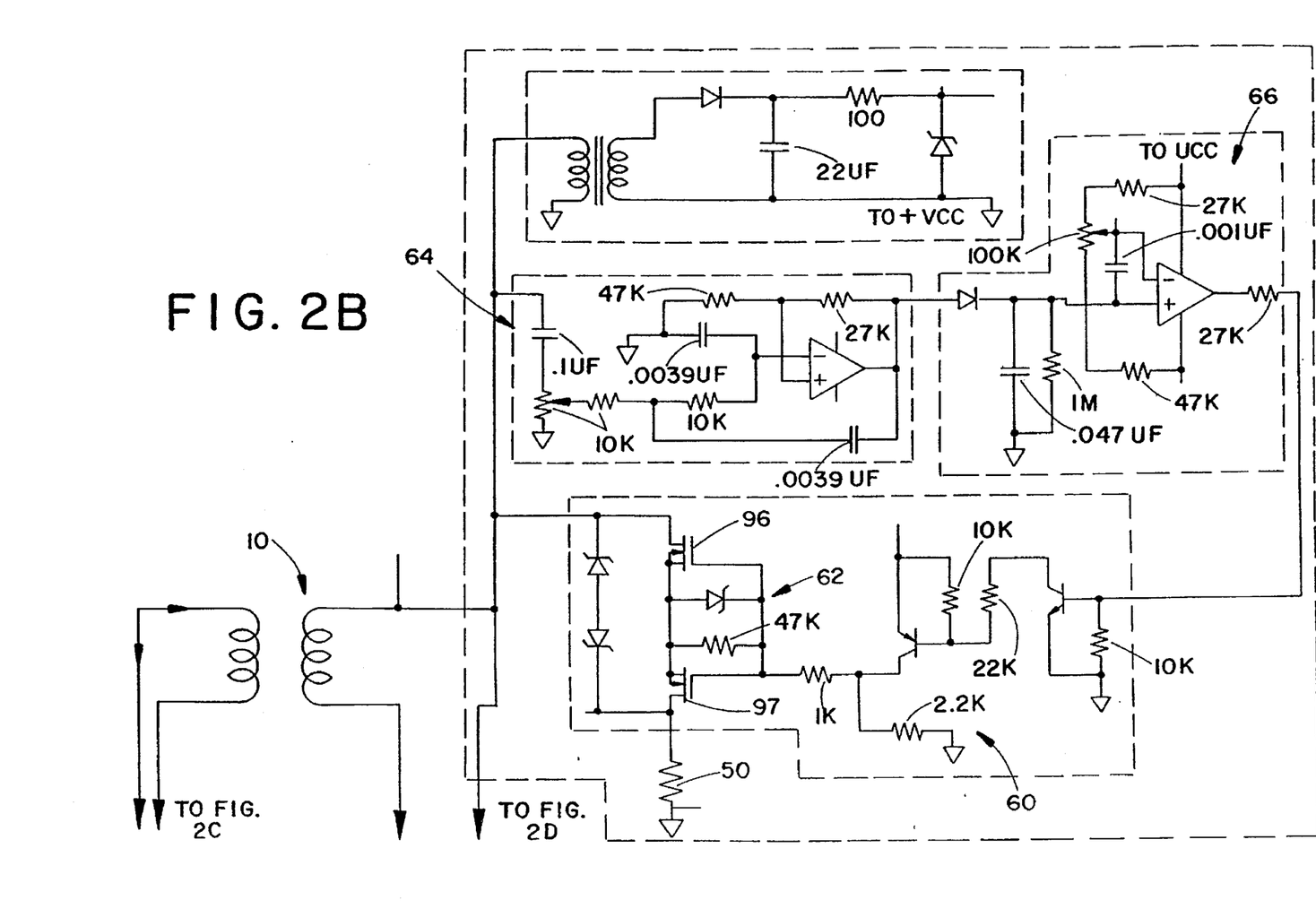
Figure 2C:
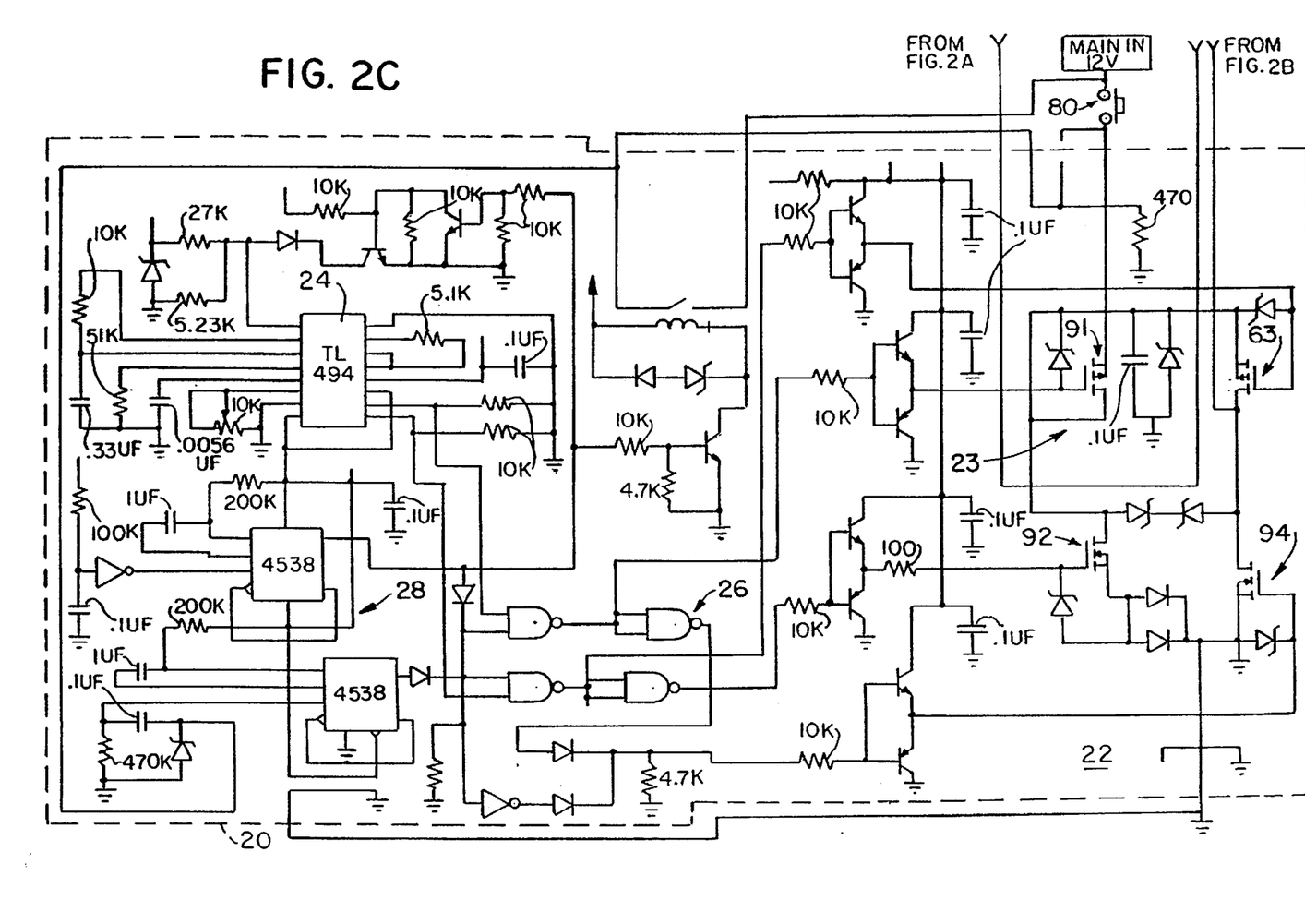
Figure 2D:
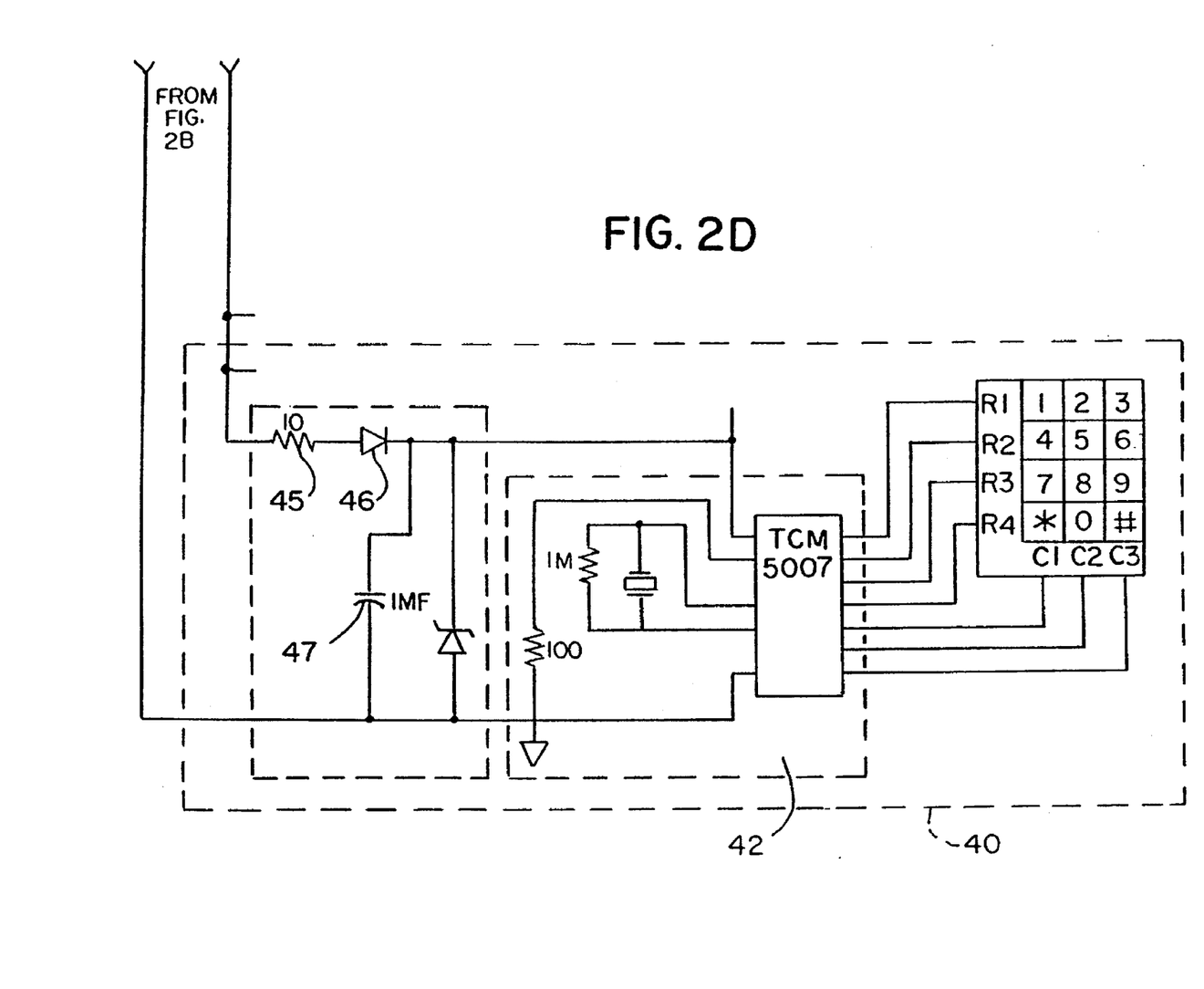
Figure 3:
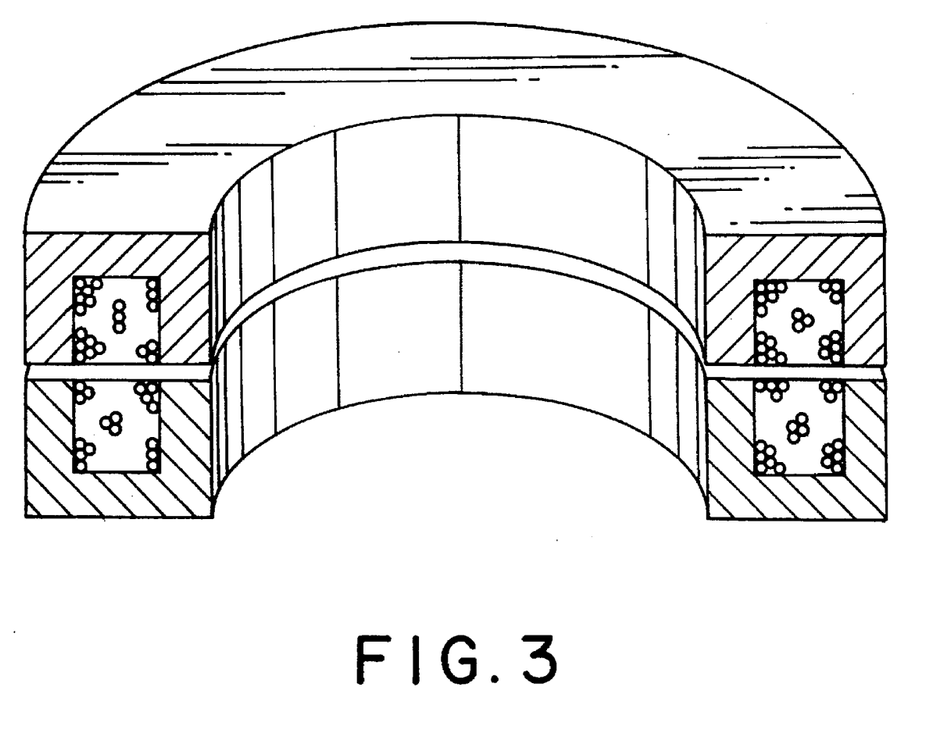

Referring now to the drawings wherein the showings are for purposes of illustrating the preferred and alternative embodiments of the invention only, and not for purposes of limiting same, the FIGURES show a control circuit particularly intended for use in a steering column of a motor vehicle (not shown). The control circuit transfers power and communication signals through a steering column comprised of a selectively rotatable wheel and a fixed steering column. The circuit is basically comprised of a common signal coupling device for contemporaneous parallel transmission of the signals through the vehicle steering column, preferably shown as a rotary transformer 10 having a primary and secondary magnetic structure, wherein the primary magnetic structure is associated with the column side (FIGS. 2A and 2C) of the steering column and the secondary magnetic structure is associated with the wheel side of the steering column (FIGS. 2B and 2D). A first circuit portion 20 (FIG. 2C, shown in dashed line), transfers a high energy power signal suitable for firing an air bag (not shown) from the column side to the wheel side. A second circuit portion 30 (FIG. 2A) transfers a low energy power signal from the column side to the wheel side suitable for operating isolated wheel side electronics and decodes driver generated control signals. A third circuit portion 40 (FIG. 2D) communicates low level control signals suitable for signalling wheel side commands (cruise, climate control and the like) from the wheel side to the column side. It is a feature of the invention that the second and third circuit portions can simultaneously operate through the transformer 10 regardless of rotational position of the wheel relative to the column and continuously without signal debilitating interaction. The output circuit portion 20 generates a relatively high power signal to ignite a squib 50 for deploying an air bag to protect the driver of the vehicle in a collision. Other elements represented in the block diagram of FIG. 1 comprise the high power solid state switch 60 which fires the squib 50 and a test circuit 70 which tests the operability of the squib firing circuit without actually firing the squib, such as at vehicle start up.

During normal operation of the circuit (non-air bag firing operation), only communication functions are required through the steering column from control switches on the wheel side back through the transformer 10 to the column side. Although to accomplish these communication functions, power must be transferred for the wheel side electronics continuously from the column side. A thirty Khz generator 32 generates a sine wave shaped power signal. A sine wave shape is used to minimize EMI interference to the vehicle system. A high pass filter 34 amplifies the signal to a level of several volts into the primary of the rotary transformer 10. With particular reference to FIG. 2A, the detailed schematic of this portion of the circuit is illustrated wherein a function generator integrated circuit 36 (such as an ICL 8038) generates the sine wave shaped signal, which is then amplified by a power amplifier integrated circuit 38 (LM 380) to the level of several volts into the transformer primary.

This power signal is coupled to the secondary winding of the transformer 10 as a low energy power signal for tone encoder circuit 40. In particular, the signal is fed through a current limiting resistor 45 (FIG. 2D) and a rectifier diode (1N 4934) 46 into a one micro farad capacitor 47. The DC voltage formed across the capacitor is the low power DC voltage source (VCC) 41 (FIG. 1) for the wheel side electronics. The high, 30 khz frequency assures that the primary winding reactance will be high enough to keep primary current to a relatively low level, since only low power transfer is necessary for normal signal communication operation. Also, the 30 khz signal can then be filtered or separated more easily from the low level communication signals which occur between 697 and 1645 hz and the high power air bag firing signal which is set at 2 khz. Although the preferred embodiment discloses the lower power signal to be 30 kkz, of course, other frequencies can be used so long as they are capable of being separated from the other frequencies with the appropriate filters.

Communication signals for the wheel side switch commands are accomplished with a standard telephone keypad encoder integrated circuit 42. This dualtone/multifrequency encoder (D.T.M.F.) merely converts switch closure commands into tone signals ranging from 697 hz to 1,645 hz which are then coupled back through the rotary transformer secondary back to the column side primary winding where tones are extracted, amplified and decoded for control purposes. These are important operational features of the subject invention since the tone signals are of a very low level of only a few millivolts in the presence of several volts for the 30 khz low energy supply signal. This operational advantage is accomplished as follows. First, the signal at the transformer primary is fed to a "Twin T" notch filter 43 tuned to 30 khz which provides significant attenuation of the 30 khz signal, yet it allows the communications tone signals to pass virtually unattenuated. The filter output is then fed to an additional RC filter. The 30 khz signal has now been reduced below the level of the tone signals. Although the tone signals are still at a very low level, at this point, they are amplified by an amplifier 44 (LM 386) for voltage amplification to a usable level. The output of the amplifier 44 is then fed to a two-stage RC filter 49 for additional filtering of any 30 khz components which may have coupled through. The now "clean" amplified tone signals are fed to a DTMF decoder 48 (75T204) and are converted to logic signals. The logic signals are fed to a multiplexer interface 99 and then to the appropriate digital signal processing circuitry through the vehicle MX bus. Both the DTMF encoder 42 and decoder 48 are crystal controlled for extreme stability under all conditions and require no tuning or adjustments. Such components enjoy wide proliferation for telephone based applications, and are accordingly inexpensive and reliable.

Although the system has been described as using DTMF encoders and decoders, other communication schemes are within the scope of the invention and have been considered and evaluated with success, so long as proper filtering is accomplished for isolation of the power supply signal frequencies. Such other methods involve modulating the tone frequencies onto the power supply signal using it as a "carrier frequency" (rather than linearly mixing them), or using frequency shift keying (FSK) techniques. Such other alternative techniques have successfully demonstrated bidirectional communication.

Air Bag Firing Condition

An air bag firing condition is evoked if a collision occurs. Then a switched command signal, i.e., fire switch 80, applies power to a high power inverter circuit 22. A square wave signal of approximately 2 khz is imposed onto the transformer primary winding through a high current "H-drive" circuit 22. At this frequency the transformer 10 is capable of coupling large amounts of power. If a low impedance load, such as the air bag squib 50, is coupled across the transformer secondary, the reflected low impedance on the primary will produce very high primary (and secondary) currents to flow, but only if an adequate power driver circuit is used.

The H-drive alternately switches the primary with forward and reverse polarity square wave signals equal to the system DC power applied to it. With a conventional 12 volt vehicle system, this is the equivalent of applying a plus and minus 12 volt square wave (24 volts peak-to-peak) onto the transformer 10, yet only using a single ended 12 volt supply. Accordingly, primary currents will exceed 20 amperes and secondary voltages and resultant currents into the squib are sufficient to fire an air bag.

In the embodiment shown in FIG. 2C, the square wave signal is initially generated by a 2 khz generator circuit 24 (TL 494 integrated circuit), especially designed for inverter and PWM power supply applications. Two alternating square wave signal outputs are generated (pins 9 and 10) to be used to drive the H-drive circuit 22. The H-drive output is comprised of four high current FET power transistors 91, 92, 93, 94, two P-channel types and two N-channel types. For operation, for instance, transistors 91 and 94 are to be turned on to conduct current through the transformer primary in one direction. In effect, one side of the winding is connected to plus 12 volts and the other side to ground. On the next half-cycle, this is reversed by turning off transistors 91, 94 and instead turning on transistors 92, 93, and in effect reversing the polarity on the transformer. The generator circuit 24 is operated in a mode that allows a brief "OFF" period between polarity reversals to assure that two FETs on one side of the bridge are not simultaneously turned on, which could cause a short across the main supply to ground (i.e., transistors 91 and 93 are never on simultaneously, or transistors 92, 94 either). Logic circuity 26 between the generator 24 and the H-drive 22 is used to switch the H-drive 22 from an inoperational state (normal system operation) to a fire condition. In other words, during normal operation of the steering control system, the H-drive 22 should not be operating in the high power inverter mode. Rather, a transistor 94 is the only FET biased on, and this is done to ground at one end of the transformer primary, which is necessary for normal operation. The other three FETS 91, 92, 93 are held in an OFF state by the logic circuitry, leaving the input side of the transformer primary effectively open for the normal communications low power supply signals to operate unhindered.

Another feature shown in the detailed schematic of the subject control system is that the reverse, source to drain substrate diode built into the FET 92 tends to clamp the input signals when they swing negative with respect to ground. This is circumvented in the circuitry shown by using a transorb D22 (high power zener diode 1N6283) in the source to ground connection of FET 92. The zener diode prevents reverse current flow from ground up to the source (and substrate diode) of FET 92 during the reverse polarity phase of the input signal (the 30 khz signal) to the transformer primary. When the H-drive 22 is in its high power inverter mode, the diode is essentially "transparent" to the circuit except for its forward bias voltage drop of approximately 0.6 volts. Because the current flow is high in the fire mode, the diode must be capable of handling this current and this is why a large zener (transorb) is used. In order to decrease the diode voltage drop in the forward direction, a "Schottky" diode D21 is shown in parallel with the zener. This can help reduce the forward voltage drop further, down to 0.2 to 0.3 volts. In the embodiment illustrated, five smaller Schottky diodes (1N5817) were used, but a single larger device would be appropriate.

A further feature of the subject inventive circuit is the use of a "one-shot" or monostable circuit 28, comprised of an integrated circuit (4538). When a fire sequence occurs, the logic steers the H-drive 22 into its high power inverter mode, the one-shot circuit 28 is triggered and causes this to occur for only a short period (200 ms), even though the fire input command from the switch 80 may stay on for an extended time. This is because only a brief period is required to fire the squib 50. This one-shot feature has the advantage of protecting the transformer from being driven for an extended period of time, which could overheat its windings.

Squib Firing Switch

On the secondary side of the transformer, under normal conditions the squib element must be isolated from it or its low resistance will shunt out the low power supply and tone communications signals. Yet, when a firing mode is to occur, the squib must be switched across the secondary by use of a low resistance, high current switch. This is accomplished by the circuit shown under "2 khz Squib Switch" (FIG. 2B). Here, a solid state, high current AC switch 62 is used to isolate the squib from the transformer secondary under normal operating conditions. Two, back-to-back, N-channel power FETs, 96 and 97, are configured to act as an AC switch. In one direction of the AC line, one of the FETs will have positive polarity across its drain to source connections, and the other FET will be reversed. The forward biased one will carry current in the normal direction from drain to source (when its gate to source is biased on), and the reverse PET will carry this current through its integral reverse source to drain substrate diode, even though it is not operating as a normal transistor in this mode. When the line polarity is on the other ½ cycle of the AC line, the roles of each FET will be reversed. Whenever a DC gate voltage is applied to the two FETs from the common source connections to the common gate connections, the AC switch will be on, and when the gate signal is removed, they will both be off, blocking current conduction in both directions. With the present circuit, the AC switch is connected to the high side of the squib load, which means that when the PETs are in an "on" condition they will "float" above the ground level along with the incoming power signal from the transformer secondary. Thus, to assure that the FET 96 gate is biased to at least 5 volts above the common source connections (to assure that FET 96 is held on), the bias signal with respect to ground must exceed the highest positive polarity voltage level of the AC signal by at least 5 volts. To derive this, a voltage booster circuit is used. A small transformer X2, is connected across the rotary transformer secondary to provide an additional power source through diode D7 and capacitor C35, current limiting resistor R61 and zener diode D8. Alternatively an additional secondary winding (of smaller gauge wire) could be incorporated into the rotary transformer to provide the step-up. The negative end of this isolated supply is then connected to the positive side of the normal wheel side power supply (Vcc), to provide the boosted voltage which is then supplied to the emitter of PNP transistor Q13. Whenever this transistor is turned on, it will tie the boosted voltage to the FET transistor gates through limiting resistor R51, turning on the FETs. Zener diode D10 prevents the gate to source voltage from ever exceeding 16 vdc, however, protecting the gate circuits from excessive voltage, particularly when the power AC signal polarity is in the reverse direction. The base of Q13 is, in turn, driven by the collector circuit of NPN transistor Q12 through resistor R55. Q12 is toggled on and off by the logic output of the level detector/comparator stage of U14b as part of the level detection 66. This is accomplished as follows: First, the 2 khz firing signal on the secondary of the rotary transformer must be distinguished from the 30 khz power supply signal, both of which have appreciable voltage level swings, but differ significantly in frequency. Secondly, the 2 khz signal must be distinguished from the communications tone signals which are very close in frequency, but much lower in amplitude. The prototype circuitry accomplishes this by using a sharp, frequency selective "low-pass" filter 64 to attenuate the 30 khz signal to a very low level, essentially rejecting it, yet allows the lower, 2 khz firing signal frequency to pass through unattenuated. The low pass filter 64, shown in FIG. 1 also, is a 2-pole, active filter comprised of operational amplifiers U14a and associated components. Although the 30 khz signal has now been practically eliminated, the communications DTMF tone signals have not, and under normal operating conditions, these will pass through the filter. Because these tone signals are very low in amplitude they can be excluded with a level detection circuit 66 after the filter 64. This is accomplished by rectifying the output of the filter with diode D9, and smoothing it with capacitor C39, then feeding this to a voltage comparator circuit comprised of U14b, and reference divider R47, VR3 and R48. The divider sets up a DC voltage level that the filter output AC peaks must exceed before U14b will provide a logic signal for firing. Only the 2 khz squib fire signal has both the low frequency and high amplitude level to pass through the filter, then be rectified to a DC level (by the 1N4148 diode D9 and the 0.1 mfd C39) to produce a DC voltage adequate to toggle the comparator which is then used to drive the gate circuit of the output AC switch, thus connecting the squib to the transformer. Note that the filter/threshold detector circuit normally operates at a very low power level, with U14 being a "micropower" type IC, assuring minimal loading on the low power 30 khz power supply link. Whenever a high power 2 khz squib firing burst comes across the transformer, the available power supply is now dramatically stiffened and the switch control circuit can be allowed to draw more operating current to turn on, this occurring when Q12 and Q13 are turned on to drive the FET gates (i.e., the squib firing switch circuit normally idles at very low current levels until a firing sequence occurs, at which time it draws more current to bias on the FETs, although this is nothing compared to the current then being switched to the squib).

Built-in Test

With most air bag systems, a test function is invoked at vehicle start up. With such a test function, the plan is to detect power up and briefly pulse the squib firing sequence by enabling the 2 khz power inverter 22, but at a power level below the ignition point of the squib, while checking that the squib 50 is receiving the inverter signal. The subject invention accomplishes this task by reducing the duty cycle of the inverter signal. Segments of the square wave having nearly 50% duty cycle on the positive polarity poles and 50% on the negative poles, the pulses are only on for approximately 5–10% of the normal ON time. This is accomplished with the wheel side built in test circuit 70 and the column side built in test circuit 90. The column side built in test circuit includes a system power up detect circuit 92, a PWM duty cycle control 94 and a relay driver logic circuit 96 which operates the relay for controlling the contacts across the air bag switch 80. With particular reference to FIG. 2, the column side built in test circuit is accomplished with the TL494 generator chip, because it is designed for pulse width modulation control. For instance, by varying DC voltage level on pin 3, the output duty cycle can be varied from virtually 0 to 100%.

Thus, for the power up test, the total squib firing circuitry comprising transformer 10, squib firing circuit 20 and squib switch 60 can be tested without applying enough heating duty cycle to the squib 50 to fire it. This reduced duty cycle pulse train can be detected across the built in test circuit 70 comprising sample and hold type circuit 72, then fed as a logic signal from logic circuitry 74 to the tone encoder circuit 40, and then transmitted as a tone signal back to the column side decoder 48 as an "OK" signal for the bag test function immediately after the power pulse train terminates. Such a test scheme provides much more confidence in the total air bag firing system than a simple test that merely looks at the resistance of the squib 50 to see if it is present.

As noted above, the subject system was faced with the particular problem of integrating all circuit functions for successful continuous operation together without interaction or damage. The synergistic operation of the subject inventive circuitry provides an air bag control and firing circuit with substantial advantages over prior art systems.

Some further comments which will be appreciated by those of ordinary skill in the art with regard to the detailed schematic shown in FIGS. 2A–2D comprise:

The 10 ohm current limiting resistor R57 and the 1N4739 zener diode D14 voltage clamp in the wheel side power supply circuit are mainly for protection when the 2 khz power inverter signal is present.

The capacitor between the output of the 20 khz driver circuit and the transformer primary cannot be too large, or its reactance, in conjunction with the low output impedance of the LM380 will shunt (attenuate) the tone frequencies coming back from the wheel side. Also, the 2 khz inverter signal would be shunted through this branch if the cap were large. Ideally, a more effective "high pass" filter should be used in this spot.

Extracting the low level tone signals in the presence of the high level 30 khz signal takes quite a bit of filtering, as described previously.

Getting the H-drive circuit to work in two or three modes, and not affect normal operation was a challenge without using a relay contactor for the switching, which would have presented timing problems as well as cost and reliability.

The transformer had to primarily be designed to efficiently transfer squib firing power from the column to the steering wheel. It was optimized to do this at about 2 khz. The other functions and circuit had to be tailored to work with this transformer. A primary to secondary turns ratio and wire sizes which were ideal for high power transfer were not ideal for the low power transfer and communications functions.

Although the continuous running, low energy power supply signal was transferred with a sine wave shape to minimize EMI generation, the high power firing signal was generated as a square wave signal for efficiency. Any brief EMI noise burst during an air bag firing scenario would not be of concern. The active filter use in the squib firing switch could also be accomplished in other ways, but whatever filter is used, it must be capable of processing several simultaneous signals at widely different amplitude levels. Some digital filters work well with single component signals, but cannot handle combinations. Analog filtering, as used, works well. This also applies to the filtering used on the input of the DTMF tone decoder circuitry.

The H-drive circuit was required as maximum power was to be coupled to a single winding. If a center-tapped, dual 12 volt winding could have been used, the driver could have been a simple, two transistor "push-pull" output. Winding space considerations in the prototype transformer would not allow this, so forward and reverse drive of a single winding became necessary, hence the H-drive configuration.

The invention has been described with reference to the preferred embodiments. Obviously modifications and alterations will occur to others upon a reading an understanding of the specification. It is our intention to include all such modifications and alterations insofar as they come within the scope of the appended claims or the equivalents thereof.

Having thus described our invention, we now claim:

1. A control circuit for transferring power and communication signals through a vehicle steering column comprising:
    a rotary transformer having a primary and a secondary magnetic structure, wherein the primary magnetic structure is associated with a column side of the steering column and the secondary magnetic structure is associated with a wheel side of the steering column,
    a first circuit for generating a high energy power signal suitable for firing an air bag and for transferring through said rotary transformer said signal from the column side to the wheel side,
    a second circuit for transferring through said rotary transformer a low energy power signal from the column side to the wheel side suitable for operating isolated wheel side electronics, and
    a third circuit for transferring through said rotary transformer low level control signals suitable for signaling of wheel side commands from the wheel side to the column side, wherein the second and third circuits can continuously and simultaneously operate without signal debilitating interaction.

2. The control circuit as claimed in claim 1 wherein the first circuit includes a fire switch associated with the column side enabled by a vehicle collision and a squib switch associated with the wheel side for connecting the high energy power signal to a squib element at a firing condition for the air bag.

3. The control circuit as claimed in claim 2 wherein the squib switch includes means for isolating the squib element from the low energy power signal and the low level control signals in normal operating conditions to preclude shunting thereof by the squib element.

4. The control circuit as claimed in claim 3 wherein the means for isolating comprises a high current switch for connecting the high energy power signal to the squib element and means for filtering the low energy power signal and the low level control signals from the squib element.

5. The control circuit as claimed in claim 4 wherein the high energy power signal is selectively set to a frequency detectably spaced from a frequency of the low energy power signal and the high energy power signal has a voltage level detectably spaced from a voltage level of the low level control signals, and further wherein the means for filtering comprises a frequency band filter for attenuating the low energy power signal and a level detection circuit for excluding the low level control signals.

6. The control circuit as claimed in claim 5 wherein the high energy power signal is selectively set to a frequency of 2 KHz and the low energy power signal is selectively set to a frequency of 30 KHz.

7. The control circuit as claimed in claim 2 wherein the first circuit further includes a squib power circuit associated with the fire switch for generating the high energy power signal.

8. The control circuit as claimed in claim 7 wherein said squib power circuit includes an inverter circuit for generating the high energy power signal at a peak to peak level of twice vehicle system supply.

9. The control circuit as claimed in claim 8 wherein said squib power circuit includes means for enabling the inverter circuit in an on state during a test condition at a reduced duty cycle insufficient to ignite the squib element.

10. The control circuit as claimed in claim 7 wherein said squib power circuit further includes a one-shot circuit for selectively limiting transmission of the high energy power signal for avoiding coil damage to the transformer.

11. The control circuit as claimed in claim 7 wherein said squib power circuit further includes test circuit means for testing if the squib element is receiving the high energy power signal at vehicle start up comprising means for detecting a power up of the control circuit and means for pulsing the squib element with the high energy power signal at a selectively reduced power level selected to be below an ignition point of the squib element.

12. The control circuit as claimed in claim 1 wherein said third circuit includes means for filtering the low level control signals from the low energy power signal comprising a frequency band filter tuned to attenuate the low energy power signal and an amplifier for amplifying a voltage level of the low level control signals.

13. The control circuit as claimed in claim 12 wherein said third circuit further includes a decoder circuit for converting the low level control signals to logic signals.

14. A vehicle steering column signal system for coupling power and control signals between a column side and a wheel side of a vehicle steering column comprising a circuit means for generating a high power supply signal for firing an air bag, a low power supply signal for biasing wheel side circuitry and a low level control signal indicative of operator initiated wheel side commands, a common signal magnetic coupling device for contemporaneous parallel transmission of said signals through the vehicle steering column, and means for respective independent identification of said signals when said signals are transferred in concert through the common signal coupling device without signal damaging interaction.

15. The system as claimed in claim 14 wherein the signals are predetermined to be detectably spaced with respect to one of frequency and voltage level.

16. The system as claimed in claim 15 wherein the high power supply signal is fixed to a first frequency detectably spaced from a second frequency of the low power supply signal, and the high power supply signal has a first voltage level detectably different from a second voltage level of the low level control signal.

17. The system as claimed in claim 16 wherein the means for respective independent identification comprises a frequency band filter for attenuating the low power supply signal from the high power supply signal and a voltage level detector for excluding the low level control signal.

18. The system as claimed in claim 14 wherein the common signal coupling device comprises a contactless transmitter.

19. The system as claimed in claim 14 wherein the common signal coupling device comprises a wideband transformer.

20. The vehicle steering column signal system as defined in claim 14 wherein said common signal magnetic coupling device comprises at least one rotary transformer.

21. The vehicle steering column signal system as defined in claim 20 wherein said at least one rotary transformer includes first and second coils.

22. A vehicle steering column control system for communicating operator initiated commands from a wheel side of a vehicle steering column to a column side and an air bag firing signal from the column side to the wheel side comprising a contactless rotary transformer disposed in the steering column to provide uniform electrical coupling of the wheel side and the column side regardless of rotational angle between primary and secondary magnetic structures of the transformer, and circuitry for generating a low energy power supply signal for operating wheel side electronics, for transmitting through the rotary transformer a low level control signal representative of the operator initiated commands and for transmitting through the rotary transformer a high energy air bag firing signal, and including circuit means for respective independent identification of the signals whereby said signals can be communicated in concert through the rotary transformer.

23. A method for firing an air bag disposed in a vehicle steering column including a non-contacting device for transferring a plurality of power and control signals between a wheel side and column side of the steering column comprising the steps of generating a low energy power supply signal for operating wheel side electronics at a first frequency and transmitting through said non-contacting device said low energy power supply signal from the column side to the wheel side, isolating said low energy power supply signal from a squib element, communicating through said non-contacting device from the wheel side to the column side a low level control signal representative of operator initiated wheel side commands, generating a high energy power supply signal suitable for igniting the squib element to fire the air bag at a second frequency detectably different from the first frequency, and transmitting through said non-contacting device said high energy power supply signal from the column side to the wheel side.

* * * * *